(12) United States Patent
Noro et al.

(10) Patent No.: US 7,976,027 B2
(45) Date of Patent: Jul. 12, 2011

(54) INTERCOMPARTMENT SEALING MEMBER FOR VEHICLE

(75) Inventors: Yoshinobu Noro, Wako (JP); Douglas J. Duff, Marysville, OH (US); Andy Sweigart, Marysville, OH (US); Katsuyuki Suzuki, Tokyo (JP); Takashi Komoriya, Nagoya (JP)

(73) Assignee: Honda Motor Co., Ltd., Tokyo (JP)

( * ) Notice: Subject to any disclaimer, the term of this patent is extended or adjusted under 35 U.S.C. 154(b) by 380 days.

(21) Appl. No.: 11/907,993

(22) Filed: Oct. 19, 2007

(65) Prior Publication Data

US 2009/0102139 A1 Apr. 23, 2009

(51) Int. Cl.
*F16J 3/00* (2006.01)
(52) U.S. Cl. ......................................... 277/634
(58) Field of Classification Search .................. 277/634, 277/394, 395, 511, 635, 504, 315; 280/779, 280/780
See application file for complete search history.

(56) References Cited

U.S. PATENT DOCUMENTS

| | | | | |
|---|---|---|---|---|
| 418,439 A * | 12/1889 | Brill | ........................ | 277/356 |
| 2,797,955 A * | 7/1957 | Wilfert | ........................ | 296/1.06 |
| 3,220,756 A * | 11/1965 | Templeton | .................... | 403/162 |
| 3,240,502 A * | 3/1966 | Snyder | ........................ | 277/507 |
| 3,248,955 A * | 5/1966 | Templeton | .................... | 403/50 |
| 3,518,359 A * | 6/1970 | Trimble et al. | ........... | 174/153 G |
| 3,745,612 A * | 7/1973 | Seckerson | .................... | 411/509 |
| 4,165,105 A * | 8/1979 | Hahn | ............................. | 285/19 |
| 5,492,338 A * | 2/1996 | Grafenstein | .................. | 277/630 |
| 6,299,177 B1 * | 10/2001 | Rehberg et al. | .............. | 277/634 |
| 6,543,786 B2 * | 4/2003 | Osumi et al. | ................. | 277/549 |
| 2008/0246229 A1 * | 10/2008 | Ott | ............................... | 277/634 |

FOREIGN PATENT DOCUMENTS

| | | |
|---|---|---|
| JP | 10-095352 | 4/1998 |
| JP | 2007-223378 | 9/2007 |

* cited by examiner

*Primary Examiner* — Shane Bomar
*Assistant Examiner* — Kipp C Wallace
(74) *Attorney, Agent, or Firm* — Arent Fox LLP (57) ABSTRACT

Sealing member seals a through-hole formed in a panel that defines first and second compartments of a vehicle, and it has a tubular section and stopper portions. The intercompartment sealing member is fit onto a receiving member provided in the first compartment. Lip section, extending from the tubular section toward the panel in a spread-out form, is bendable (reversible) with respect to the panel. The lip section has operating convexities provided on its panel-facing surface. Manipulation of the operating convexities can invert the lip section, initially bent away from the panel, to contact the panel. The stopper portions function to limit a bent amount through which the lip section can be bent away from the panel (in the reverse direction).

5 Claims, 8 Drawing Sheets

INTERCOMPARTMENT SEALING MEMBER FOR VEHICLE

FIELD OF THE INVENTION

The present invention relates to an intercompartment sealing member for a vehicle for sealing a through-hole provided in a panel for dividing a first compartment and a second compartment of the vehicle.

BACKGROUND OF THE INVENTION

A vehicle is divided into a plurality of compartments by panels. For example, a typical automobile is divided into a passenger compartment and an engine compartment or room by a panel (or dashboard).

A steering wheel of a steering device is disposed in the passenger compartment. In the steering device, a gear mechanism is connected to the steering wheel via a steering shaft, so that steering torque of the steering wheel is transmitted to steered road wheels via the gear mechanism. The gear mechanism is accommodated in a steering gear case. An engine, transmission and steering gear case are disposed in the engine compartment.

The above-mentioned panel has a through-hole through which the steering shaft passes. The through-hole must be sealed by an intercompartment sealing member in order for the passenger compartment and the engine compartment to be adequately divided. A technique for sealing a through-hole, provided in a panel, by an intercompartment sealing member is disclosed in Japanese Patent No. 3356935.

Figure 7A:
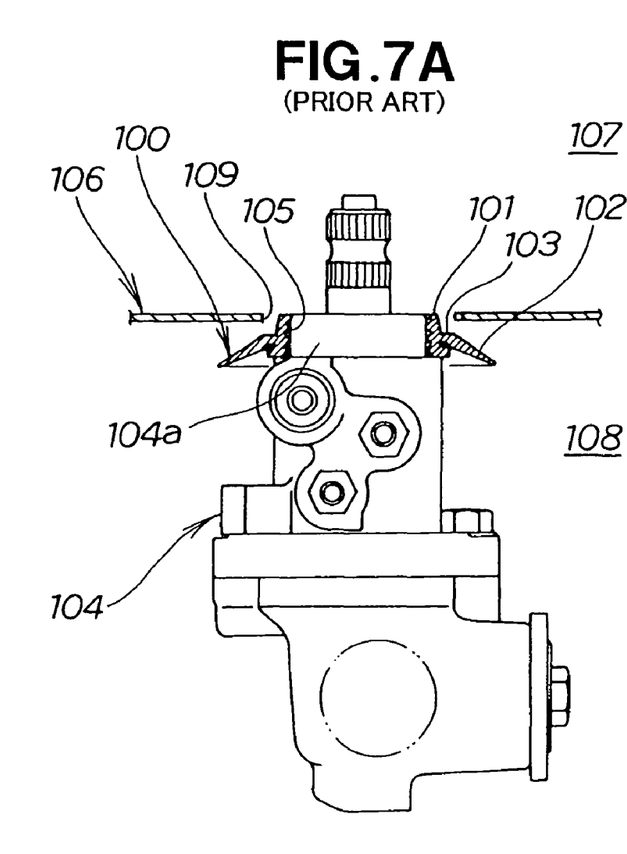
FIGS. 7A and 7B are diagrams used to describe an operational sequence for mounting a first conventionally-known intercompartment sealing member.

A general outline of the technology disclosed in Japanese Patent No. 3356935 (hereinafter "first conventionally-known technique") shall be given hereunder with reference to FIGS. 7A and 7B. FIG. 7A partially shows a vehicle having a conventional intercompartment sealing member.

A conventional vehicle is divided by a panel 106 into a passenger compartment 107 and an engine compartment 108, as shown in FIG. 7A. A steering gear case 104 of a steering device is disposed in the engine compartment 108. The panel 106 has a through-hole 109 through which a steering shaft (not shown) passes. The through-hole 109 is sealed by an intercompartment sealing member 100.

The intercompartment sealing member 100 is an integrally formed item composed of a tubular section 101 and a lip section 102, and is made of an elastic material. The lip section 102 is a part that extends out from an outer peripheral surface of the tubular section 101 in a conical shape. Further, the lip section 102 has a thin (or small-thickness) part 103 at a portion of the base corresponding to the tubular section 101. For this reason, the lip section 102 can be bent in an axial direction of the tubular section 101.

The intercompartment sealing member 100 can be mounted via the following process or operational sequence.

First, a fitting hole 105 of the tubular section 101 is fitted into a part 104a of the steering case 104 that faces the through-hole 109, and the lip section 102 is bent toward a side opposite the panel 106 (first step), as shown in FIG. 7A. The reason for bending the lip section 102 in the direction opposite the panel 106 is to prevent the lip section 102 from being damaged when the operation of the next step is performed.

Next, the steering gear case 104 and the lip section 102 are positioned with respect to the panel 106 and through-hole 109 in the engine compartment 108 (second step).

Figure 7B:
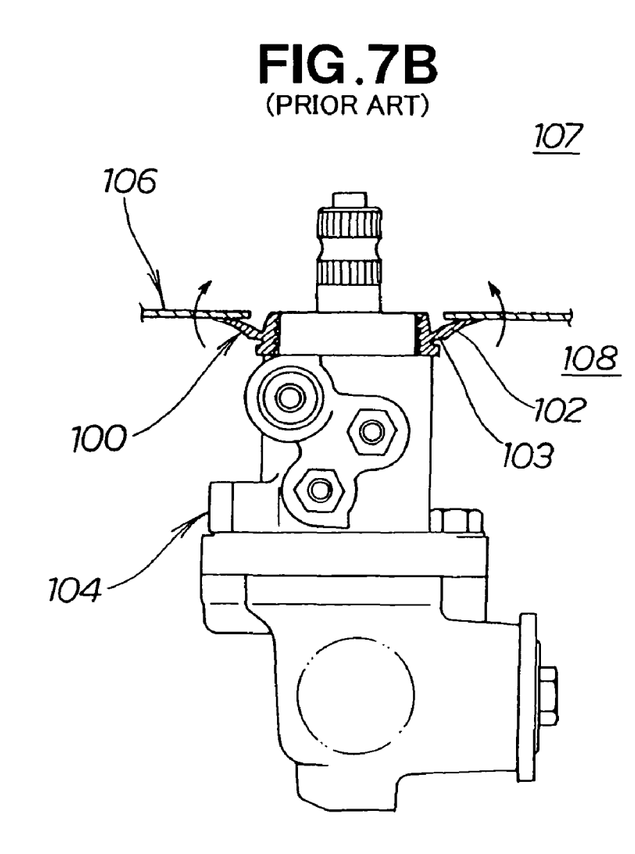

The lip section 102 is then bent toward the panel 106 in the engine compartment 108, whereby an end of the lip section 102 sealably makes contact with a surface of the panel 106 (third step), as shown in FIG. 7B.

The operation for mounting the intercompartment sealing member 100 between the passenger compartment 107 and the engine compartment 108 is thereby finished.

As has been described above, the operation of the third step is performed from the engine compartment side. However, the engine, transmission, and various other components are disposed in the engine compartment 108. For this reason, the intercompartment sealing member 100, which is mounted to the steering gear case 104, is difficult to see and work space is limited. Therefore, the third-step operation is difficult to perform.

One example technique for enhancing the workability with which to mount an intercompartment sealing member is known from Japanese Patent Laid-Open Publication No. 2007-223378 (JP 2007-223378 A).

A general outline of the technique disclosed in JP 2007-223378 A (hereinafter "second conventionally-known technique") will be given below with reference to FIGS. 8A and 8B. Basic construction of the second conventionally-known technique shown in FIGS. 8A and 8B is substantially the same as that of the first conventionally-known technique shown in FIGS. 7A and 7B, and structural elements similar to those shown in FIGS. 7A and 7B are indicated by the same reference numerals as in FIGS. 7A and 7B.

Figure 8A:
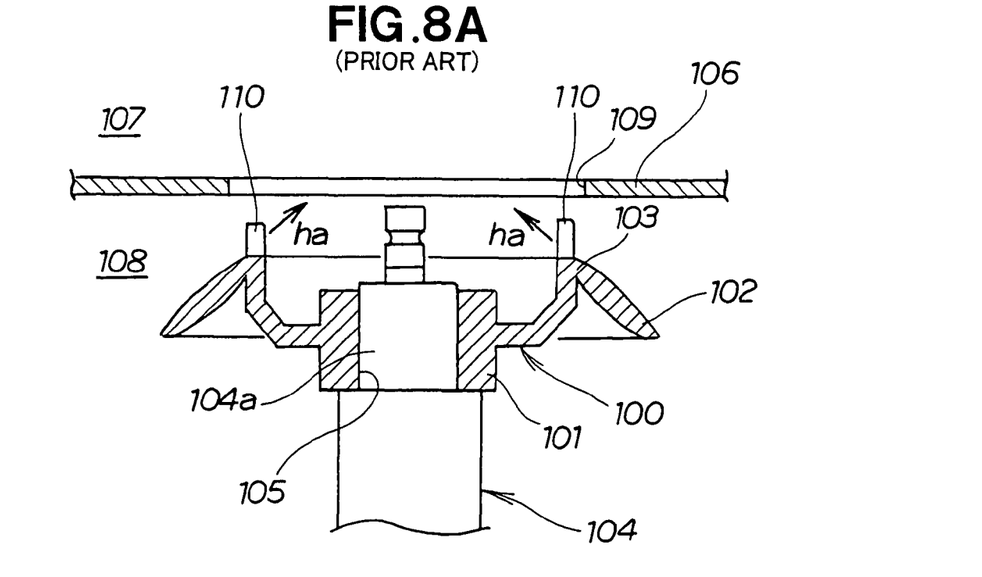
FIGS. 8A and 8B are diagrams used to describe an operational sequence for mounting a second conventionally-known intercompartment sealing member.
Figure 8B:
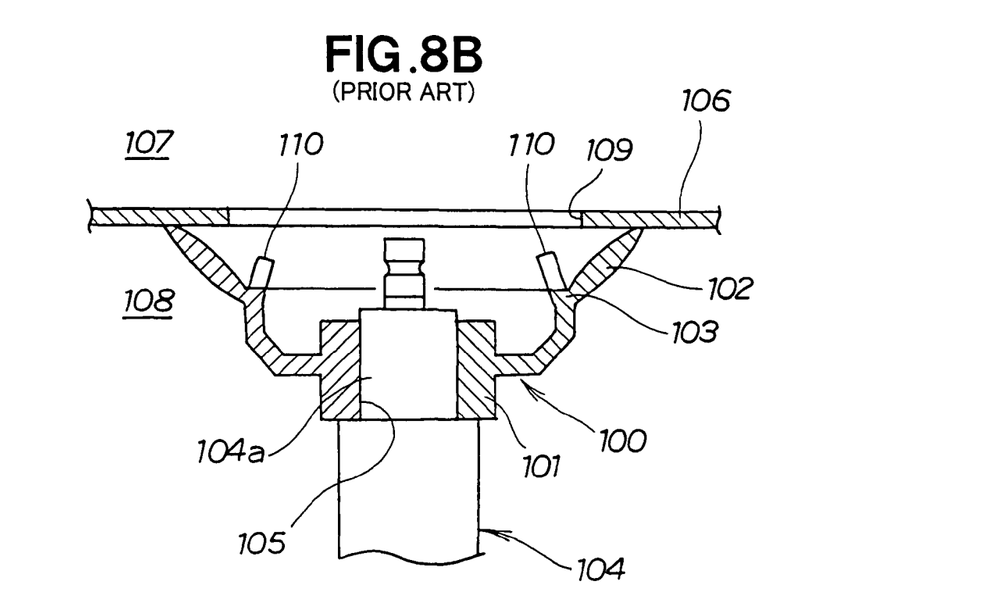

As seen in FIG. 8A, the intercompartment sealing member 100 includes two operating protrusions 110 operable to bend the lip section 102, and these two operating protrusions 110 are provided at two positions on an outer peripheral surface of the cone-shape lip section 102.

The intercompartment sealing member 100 shown in FIG. 8A can be mounted via the following process or operational sequence.

First, the fitting hole 105 of the tubular section 101 is fitted into the part 104a of the steering case 104 that faces the through-hole 109, and the lip section 102 is bent toward the side opposite the panel 106, as shown in FIG. 8A.

Next, the steering gear case 104 and the lip section 102 are positioned with respect to the panel 106 and through-hole 109 in the engine compartment 108.

Then, a human operator inserts his or her hand from the passenger compartment 107 via the through-hole 109 and then pushes or collapses the operating protrusions 110 radially inwardly of the lip section 102 as indicated by arrows ha. As a consequence, the lip section 102 separated from the surface of the panel 106 is bent toward the panel 106 by its own elasticity. As shown in FIG. 8B, the outer peripheral edge sealably contacts the surface of the panel 106.

The operation for mounting the intercompartment sealing member 100 between the passenger compartment 107 and the engine compartment 108 is thereby finished.

As the lip section 102 is bent toward the side opposite the panel 106 as shown in FIG. 8A, it is held in the bent state by its elasticity. Further, as the operating protrusions 110 are bent radially inwardly of the lip section 102 as indicated by arrows ha, a force that bends or inverts the lip section 102 toward the panel 106 (i.e., "inverting force") acts on the lip section 102. Because regions of the lip section 102 where the operating protrusions 110 are provided are subjected to great inverting forces, they can be easily bent to the panel 106. However, because regions of the lip section 102 remote from the operating protrusions 110 are subjected to small inverting forces, they can not be easily bent back or inverted toward the panel 106. Reliably inverting the lip section 102 evenly toward the panel 106 can enhance the mounting workability.

Therefore, there has been a great need for a technique that can significantly enhance the mounting workability of the intercompartment sealing member.

SUMMARY OF THE INVENTION

According to the present invention, there is provided an improved sealing member designed to be disposed between a first compartment and a second compartment of a vehicle for sealing a through-hole formed in a panel that defines the first and second compartments, the sealing member being formed of an elastic material and comprising: a tubular section designed to sealably fit onto a through-hole-facing end of a receiving member disposed in the first compartment; a lip section extending from the tubular section toward the panel in a spread-out form to surround the through-hole and sealably contact a surface of the panel, the lip section being bendable in a direction of contact such that the lip section contacts the surface of the panel and in a reverse direction such that the lip section gets away from the surface of the panel; an operating convexity provided on a panel-facing surface of the lip section for facilitating an operation to bend the lip section; a stopper portion for limiting a bent amount through which the lip section can be bent in the reverse direction.

Namely, the intercompartment sealing member of the present invention has the stopper portion for limiting the bent amount through which the lip section can be bent in the reverse direction away from the surface of the panel. Thus, the bent amount is limited by the stopper portion as the lip section is bent away from (i.e., in the reverse direction from) the surface of the panel. As the human operator manipulates (e.g., bends or pushes) the operating protrusion or convexity, an inverting force acts on the lip section so as to invert the lip section toward the surface of the panel. Because the bent amount is limited by the stopper portion in this manner, the lip section can be readily bent toward the surface of the panel even with a small manipulating force from the human operator. Thus, the lip section can be reliably inverted toward the surface of the panel uniformly along the entire periphery thereof. Further, the human operator may manipulate the operating convexity with only a small force.

In the aforementioned manner, the lip section can be reliably bent from one of the compartments with an utmost ease even when the lip section is difficult to bend in the other compartment where the intercompartment sealing member is disposed. As a result, the mounting workability of the intercompartment seal member can be even further enhanced.

Preferably, the stopper portion is located to be phase-shifted with respect to the operating convexity as the lip section is viewed from the side of the distal end thereof facing the panel.

Preferably, the lip section has, between the proximal end thereof continuous with the tubular section and the distal end thereof facing the panel, a thin part that functions as a bending-start part when the lip section is bent, and the stopper portion is located between the thin part and the proximal end.

Preferably, the first compartment is an engine compartment of the vehicle while the second compartment is a passenger compartment of the vehicle, and the sealing member is designed as a member for sealing a space between the engine compartment and the passenger compartment.

Further, preferably, the receiving member is a steering gear case of a steering gear mechanism of a steering device, the steering device includes a steering wheel disposed in the passenger compartment, and a steering torque transmission member for transmitting steering torque, produced via the steering wheel, to the steering gear mechanism. The through-hole is a hole formed for passage therethrough of the steering torque transmission member and designed to surround the steering torque transmission member.

BRIEF DESCRIPTION OF THE DRAWINGS

Certain preferred embodiments of the present invention will be described in detail below, by way of example only, with reference to the accompanying drawings, in which.

DETAILED DESCRIPTION OF THE PREFERRED EMBODIMENTS

Figure 1:
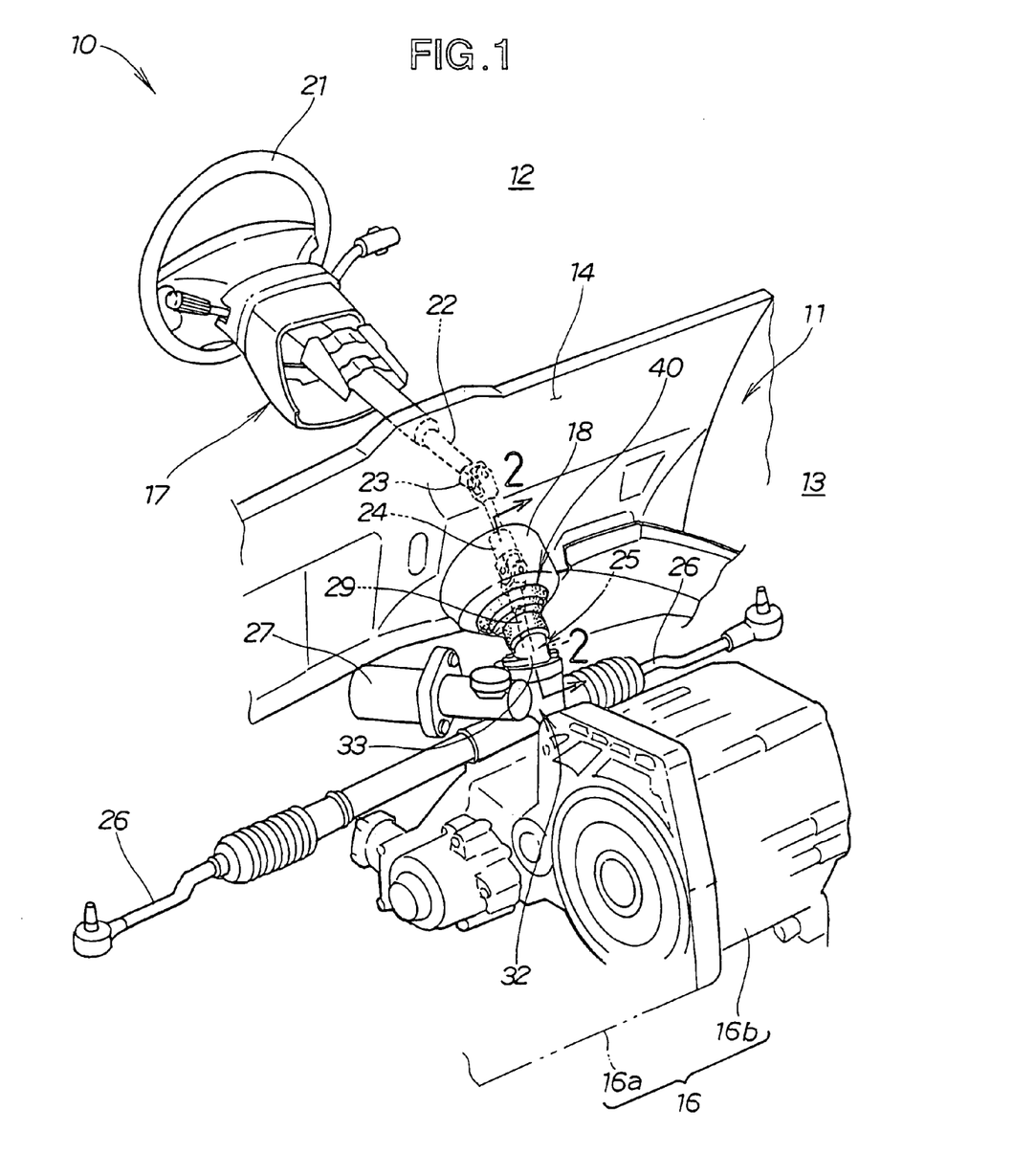
FIG. 1 is a perspective view showing relevant parts of a vehicle comprising an intercompartment sealing member in accordance with an embodiment of the present invention.

A vehicle 10 is, for example, an automobile, as shown in FIG. 1. A front part of a vehicle body 11 of the vehicle 10 is divided into a front engine compartment 13 and a rear passenger compartment 12 by a dashboard (or panel) 14.

The passenger compartment 12 is a space in which passengers sit, and it is provided with a variety of devices for driving, including a steering wheel 21 of a steering device 17. The engine compartment 13 is composed of an engine 16a and a transmission 16b, and it is a space for accommodating a power-generating unit 16. In the following description, the term "engine compartment 13" shall be suitably substituted with "first compartment 13" while the term "passenger compartment 12" shall be suitably substituted with "second compartment 12".

The steering device 17 is composed of the steering wheel 21 and a steering mechanism 25 that is disposed in the engine (or first) compartment 13. The steering wheel 21 is connected to an input shaft 29 of the steering gear mechanism 25 via a steering shaft 22 and shaft joints 23 and 24. The steering shaft 22 and shaft joints 23 and 24 are "steering torque transmission members" for transmitting steering torque, generated by the steering wheel 21, to the steering gear mechanism 25.

The steering gear mechanism 25 transmits steering torque from the steering wheel 21 to steered road wheels (not shown) via left and right tie rods 26, and it is accommodated in a steering gear case 32. The steering gear mechanism 25 comprises an auxiliary motor 27 for adding auxiliary torque to the steering torque. The steering gear case 32 is disposed between the dashboard 14 and power-generating unit 16 in the engine compartment 13.

Figure 2:
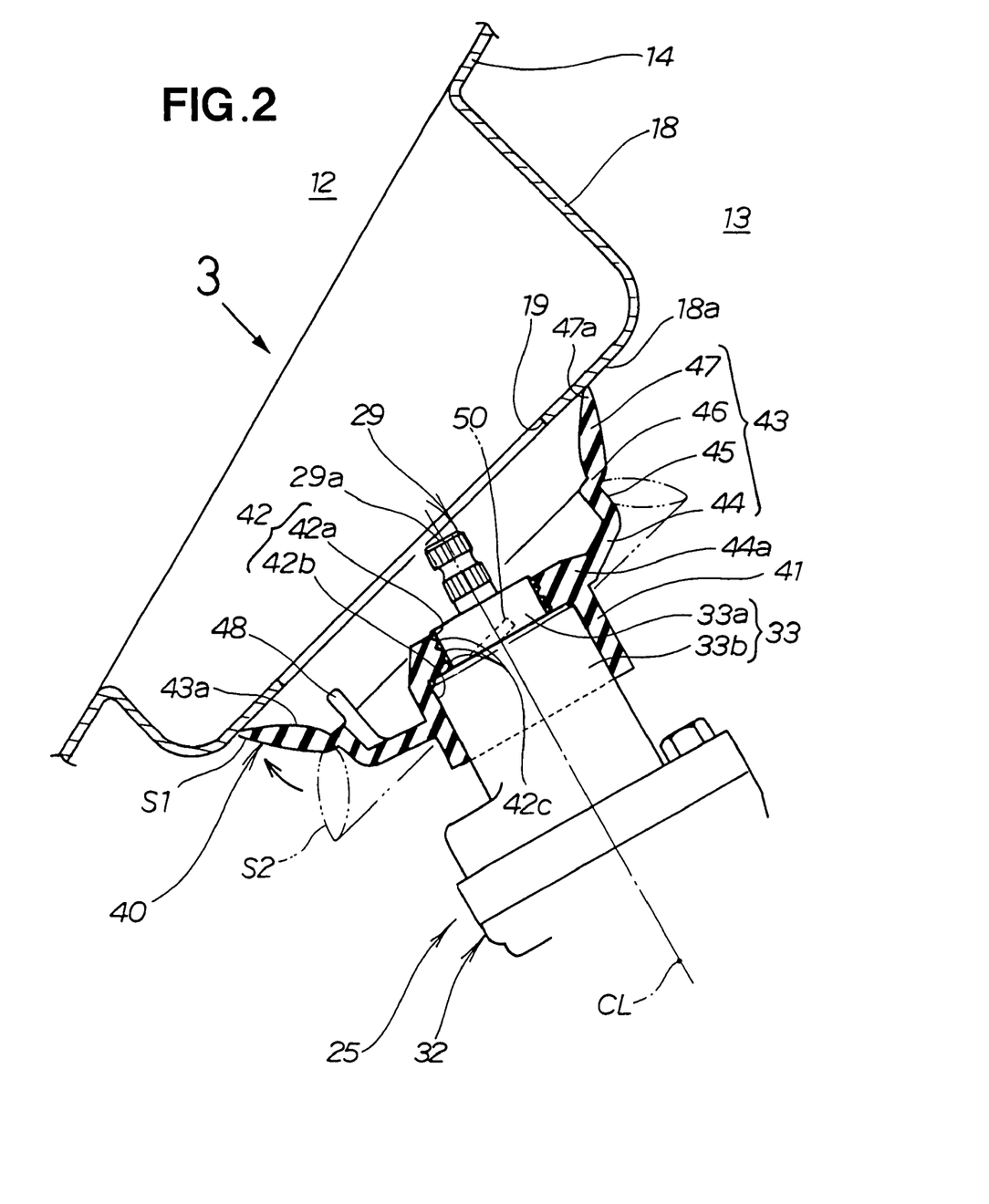
FIG. 2 is a cross-sectional view taken along line 2-2 of FIG. 1.

The dashboard 14 has a bulging or expanding part 18 that expands outward toward the engine compartment 13 in a substantially cupped shape, and a through-hole (opening) 19 formed in a flat bottom surface 18a of the expanding part 18

(i.e., surface 18a on the engine compartment 13 side), as shown in FIGS. 1 and 2. The through-hole 19 extends in the longitudinal direction of the vehicle body 11, for passage therethrough of the steering torque transmission members 22, 23 and 24. Provision of the expanding part 18 may be optional. In the case where the expanding part 18 is omitted, the through-hole 19 is formed directly in the dashboard 14. The bottom surface 18a will hereinafter be referred to as the "surface 18a of the dashboard 14 (or surface 18a of the panel 14)."

An end 33 (distal end 33) of the steering gear case 32 that faces the through-hole 19 is composed of a case distal end 33a that faces the through-hole 19 and is formed on the distalmost end, and a case base end 33b formed on the proximal or base end of the case distal end 33a, as shown in FIG. 2. The small-diameter case distal end 33a and large-diameter case base end 33b are formed concentrically.

Figure 3:
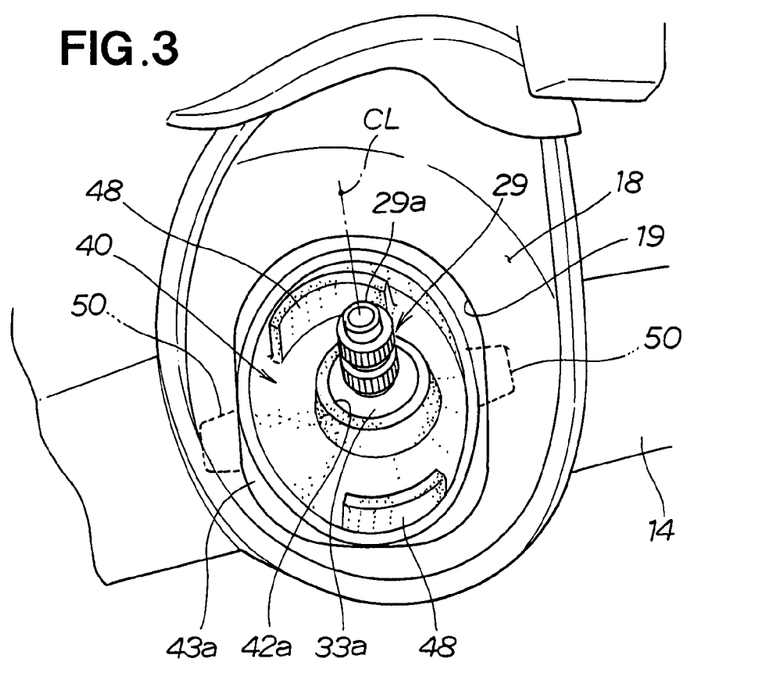
FIG. 3 is a diagram of the intercompartment sealing member as seen in a direction of arrow 3 of FIG. 2.

A distal end 29a of the input axis 29 is exposed from the distal end 33 of the steering gear case 32, and is disposed in the vicinity of the surface 18a of the dashboard 14 so as to face the through-hole 19, as shown in FIGS. 1, 2, and 3. The shaft joints 23 and 24 (see FIG. 1) connected to the input shaft 29 penetrate the through-hole 19. The steering gear case 32 will hereinafter sometimes be referred to as "receiving member 32".

The periphery of the through-hole 19 is covered by an intercompartment sealing member (elastic sealing body) 40, as shown in FIGS. 1, 2, and 3. The intercompartment sealing member 40 is provided between the passenger compartment 12 and the engine compartment 13 in order to seal the through-hole 19. In other words, the intercompartment sealing member 40 is a member for sealing the space between the surface 18a of the dashboard 14 and the distal end 33 of the steering gear case 32. At the periphery of the through-hole 19, the space between the passenger compartment 12 and the engine compartment 13 can be sealed by the intercompartment sealing member 40. Further, as shown in FIG. 1, the intercompartment sealing member 40 is designed so as to surround the shaft joints (steering torque transmission members) 23 and 24.

Figure 4:
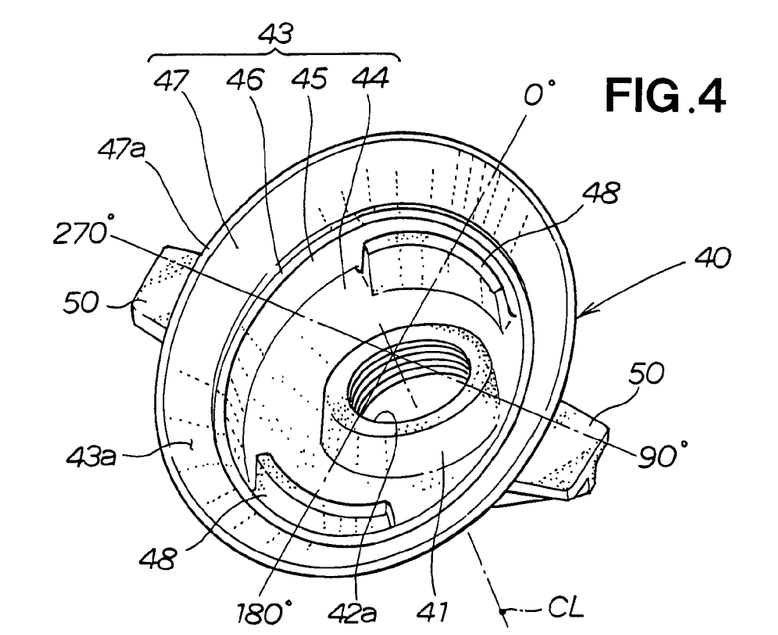
FIG. 4 is a perspective view of the intercompartment sealing member of FIG. 2 as seen from above.

The configuration of the intercompartment sealing member 40 shall be described in detail hereunder. The intercompartment sealing member 40 is integrally formed of rubber or another elastic material, and it is composed of a tubular section 41 and a lip section 43, as shown in FIGS. 2 through 4.

The tubular section (tubular base part) 41 is a cylindrical member positioned in the center of the intercompartment sealing member 40. The tubular section 41 is formed so as to sealably fit on the distal end 33 of the steering gear case 32. More specifically, the hole 42 of the tubular section 41 is a tiered through-hole composed of a small-diameter first hole 42a and a large-diameter second hole 42b.

The case distal end 33a is fitted into the first hole 42a. The second hole 42b is continuous (i.e., communicates) with the first hole 42a. The case base end 33b fits into the second hole 42b. When the tiered distal end 33 is fitted into the tiered hole 42, the tiers come into contact, and thus, the position of the tubular section 41 is fixed on the distal end 33.

At least part of an internal peripheral surface of the hole 42 of the tubular section 41 (i.e., internal peripheral surface of the first hole 42a) is an uneven surface in which a plurality of annular irregularities (serrations) 42c are centered on a center line CL of the tubular section 41. Thus, a plurality of labyrinth grooves are formed between the concavities of the annular irregularities 42c and the outer peripheral surface of the distal end 33. In this way, a labyrinth seal effect is created between the inner peripheral surface of the hole 42 and the outer peripheral surface of the distal end 33. Therefore, the sealing performance will be further increased with the distal end 33 sealably fitted into the hole 42 of the tubular section 41.

The lip section 43 is formed so that the entire body thereof is substantially bowl-shaped. The center of a bottom 44 of the lip section 43, which corresponds to a bottom plate of the bowl shape, is formed so that the tubular section 41 passes therethrough. Specifically, the lip section 43 extends from the tubular section 41, positioned at the center, toward the surface 18a of the dashboard 14 in a spread-out form. An end 47a of the lip section 43, which extends in a spread-out form as noted above, is formed so as to surround the through hole 19, and to sealably make contact with the surface 18a of the dashboard 14.

The center line CL of the tubular section 41 is inclined toward, rather than perpendicular to, the surface 18a of the dashboard 14. For this reason, the end 47a of the lip section 43 is inclined toward the central line CL so as to make uniform contact with the surface 18a. The diameter of the distal end 47a of the lip section 43 is made larger than that of the through-hole 19.

More specifically, the lip section 43 is composed of the substantially flat plate-shaped bottom 44, a cylindrical part 45, and an elastic lip 47. The cylindrical part 45 is a slightly extended part that extends from the periphery of the bottom 44 to the surface 18a of the dashboard 14. The elastic lip 47 is a portion extending in a spread-out form from the distal end of the cylindrical part 45 to the surface 18a of the dashboard 14. In other words, the elastic lip 47 is conically shaped.

The thus-configured intercompartment sealing member 40 exhibits a sealing effect in the following manner. The tubular section 41 is fitted and thereby mounted to the distal end 33 of the steering gear case 32, as shown in FIG. 2. The space between the distal end 33 and the hole 42 of the tubular section 41 is sealed by pressing the parts together. Meanwhile, the end 47a of the elastic lip 47 (distal end 47a of the lip section 43) makes uniform contact via its latent elastic force with the surface 18a of the dashboard 14 and thereby forms a seal. Therefore, the intercompartment sealing member 40 forms a seal between the passenger compartment 12 and the engine compartment 13 around the through-hole 19.

The elastic lip 47 is formed on the distal end of the cylindrical pat 45 via a thin (small-thickness) part (or curved fulcrum) 46. The thickness of the thin part 46 is made sufficiently less than that of the cylindrical part 45 in order to allow the elastic lip 47 to curve. Thus, between a proximal end part 44a continuous with the tubular section 41 and the distal end 47a facing the dashboard 14, the lip section 43 has the thin part 46 that functions as a bending-start part when the lip section 43 is bent. The lip section 43 is thus formed so as to be bendable with respect to the surface 18a of the dashboard 14 between a position S1 where the lip section 43 contacts the surface 18a (i.e., bendable in a first direction or direction of contact) as indicated by a solid line in FIG. 2 and a position S2 where the lip section 43 dose not contact the surface 18a (i.e., in a second or reverse direction where the lip section 43 gets away from the surface 18a) as indicated by an imaginary line in FIG. 2.

The height from the thin part 46 to the distal end 47a of the elastic lip 47 is substantially uniform along the entire periphery of the elastic lip 47. For this reason, the distal end 47a of the elastic lip 47 can make contact along the entire periphery with the surface 18a of the dashboard 14 with a uniform pressure.

In the lip section 43, the bottom 44 and cylindrical part 45 can suitably be omitted. In the case where the bottom 44 and cylindrical part 45 are omitted, the thin part 46 is provided directly on the outer peripheral surface of the tubular section 41. Whether or not the bottom 44 and cylindrical part 45 are to be present can be suitably selected in consideration of the size of the distal end 33 of the steering gear case 32 and the positional relationship between the distal end 33 and the dashboard 14; the size of the through-hole 19; and the bendability of the elastic lip 47.

A surface 43a of the lip section 43 that faces the dashboard 14 has, in at least one location, an operating protrusion or convexity 48. In this example, the surface 43a has operating concavities 48 at two locations, as shown in FIGS. 3 and 4. The operating protrusions or convexities 48 are members via which the lip section 43 can be bent from the position S2, indicated by the imaginary line, toward the position S1 in the direction of contact indicated by the solid line.

More specifically, the two operating convexities 48 extend toward the surface 18a of the dashboard 14 from the bottom 44 along the cylindrical part 45, as shown in FIGS. 2, 3, and 4. The two operating convexities 48 are long, thin pieces that are formed integrally with the cylindrical part 45, and that extend past the position of the thin part 46 to a point near the distal end 47a of the elastic lip 47. Further, the two operating convexities 48 are disposed at different phases substantially 180° from each other, and face away from the through hole 19 and toward the passenger compartment 12, as shown in FIGS. 3 and 4.

Namely, the two operating convexities 48 are arranged in positions where the operator can easily see them from the passenger compartment 12 through the through-hole 19. Furthermore, the two operating convexities 48 are provided in such positions and phases allowing the human operator to readily manipulate both at the same time from the passenger compartment 12 using two fingers on one hand. The shape and dimensions of the two operating convexities 48 may be set so as to allow the human operator to manipulate the operating convexities by hand.

A state shall be considered in which the elastic lip 47 is bent to the position S2 in the reverse direction indicated by the imaginary line, as shown in FIGS. 2 and 3. The cylindrical part 45 and thin part 46 are elastically deform toward the center line CL of the tubular section 41 as a result of the two operating convexities 48 collapsing (e.g., being bent, pushed, or pulled inward) toward the tubular section 41. As a result, the elastic lip 47 will be inverted via its own elasticity toward the position S1 in the direction of contact as indicated by the solid line.

Figure 5A:
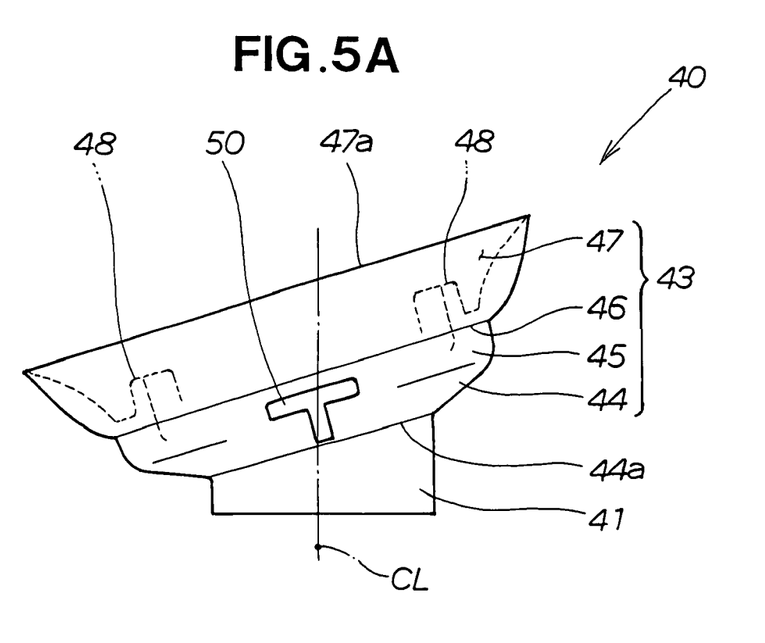
FIGS. 5A and 5B are side views of the intercompartment sealing member shown in FIG. 2.
Figure 5B:
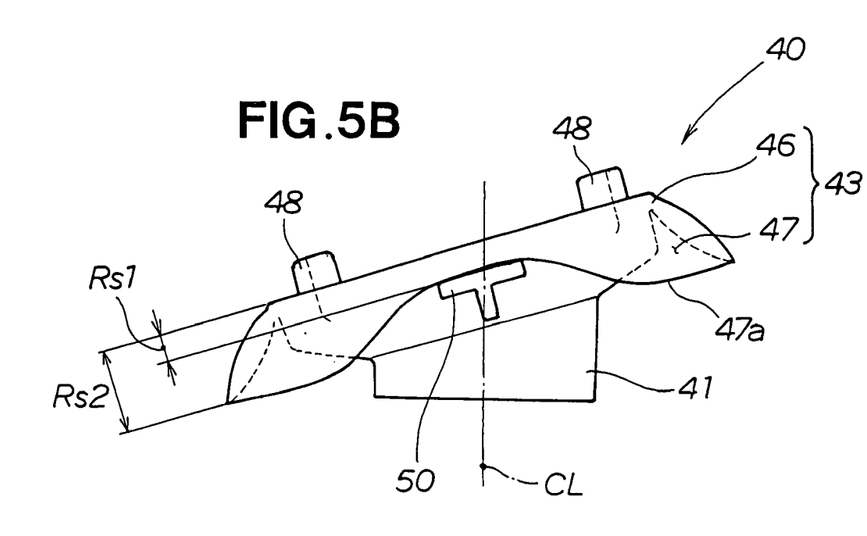

Further, as shown in FIGS. 3, 4, 5A and 5B, the lip section 43 has two stopper portions 50. FIG. 5A is a side view of the intercompartment sealing member 40 with the lip 43 not yet bent in the reverse direction, and FIG. 5B is a side view of the intercompartment sealing member 40 with the lip 43 bent in the reverse direction.

The two stopper portions 50 are provided, between the proximal end part 44a and the thin part 46, for limiting a bent amount Rs1 through which the lip section 43 can be bent in the reverse direction away from the surface 18a of the panel 14. Thus, as shown in FIG. 5B, the bent amount Rs1, from the thin part 46 to the distal end 47a, in regions where the stopper portions 50 are provided is smaller than a bent amount Rs2 in other regions where the stopper portions 50 are not provided. In this manner, the bent amount of the lip section 43 is reduced from the amount Rs2 to the amount Rs1 by the provision of the stopper portions 50.

As seen in FIG. 4, the two stopper portions 50 are located to be phase-shifted by 90° with respect to the operating protrusions 48 as the lip section 43 is viewed from the side of the distal end 47a. For example, the two operating protrusions 48 are located at 0° and 180° positions and the two stopper portions 50 are located at 90° and 270° positions.

Next, an example of a process or operational sequence for mounting the intercompartment sealing member 40 shall next be described with reference to FIGS. 6A through 6D.

Figure 6A:
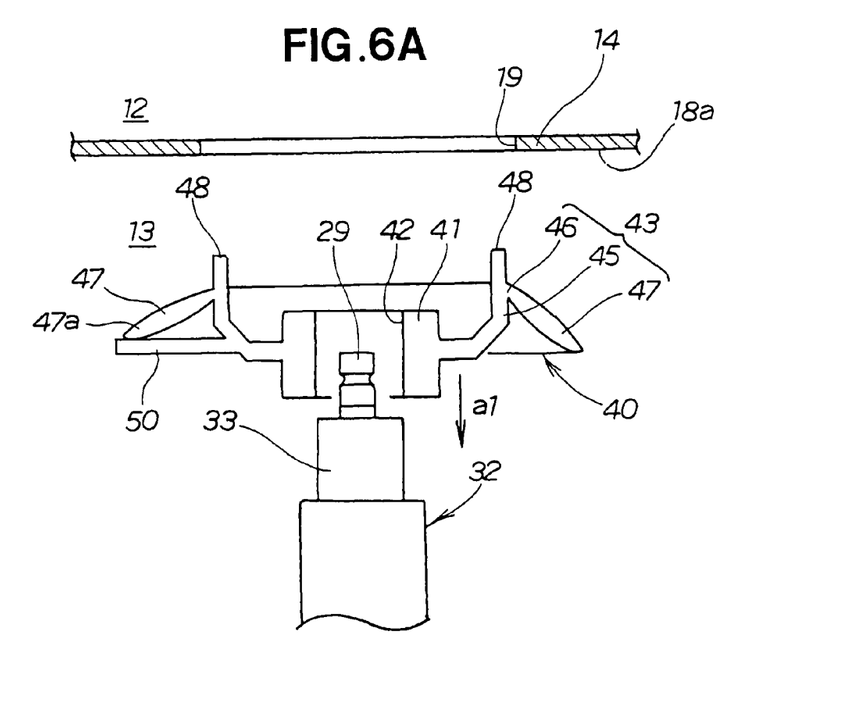
FIGS. 6A through 6D are diagrams used to describe a process or operational sequence for mounting the intercompartment sealing member shown in FIG. 2.

First, the intercompartment sealing member 40 is prepared, as shown in FIG. 6A. The tubular section 41 is then fitted into the distal end 33 of the steering gear case 32, as indicated by arrow a1. The lip section 43 is next bent toward the side opposite the dashboard 14. The lip section 43 may be bent before the tubular section 41 is fitted into the distal end 33.

Figure 6B:
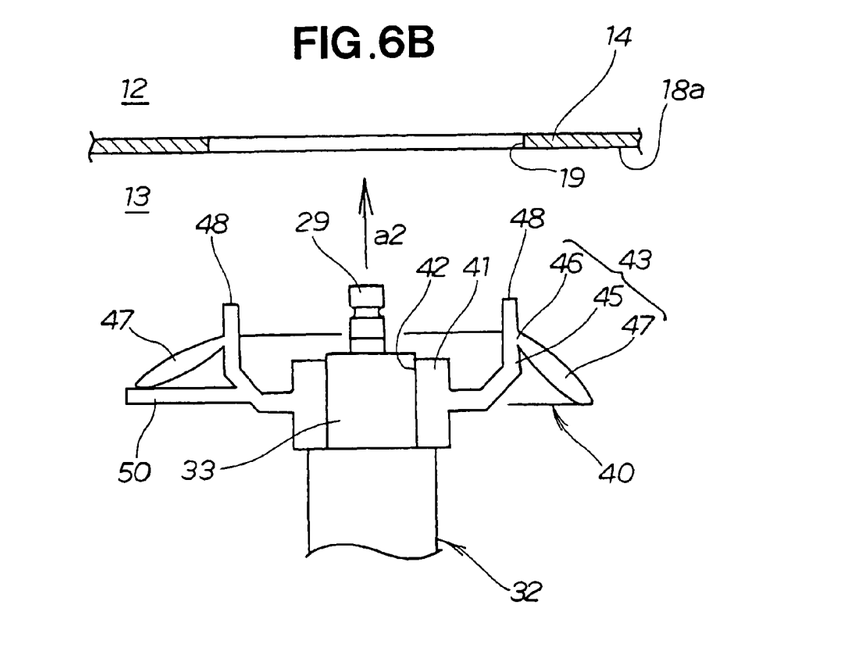

Next, in the engine compartment 13, the steering gear case 32 is moved toward the dashboard 14 as indicated by arrow a2, as shown in FIG. 6B. Then, upon being oriented to the dashboard 14 and through-hole 19, the steering gear case 32 and the lip section 43 are mounted to a predetermined position in the engine compartment 13.

Figure 6C:
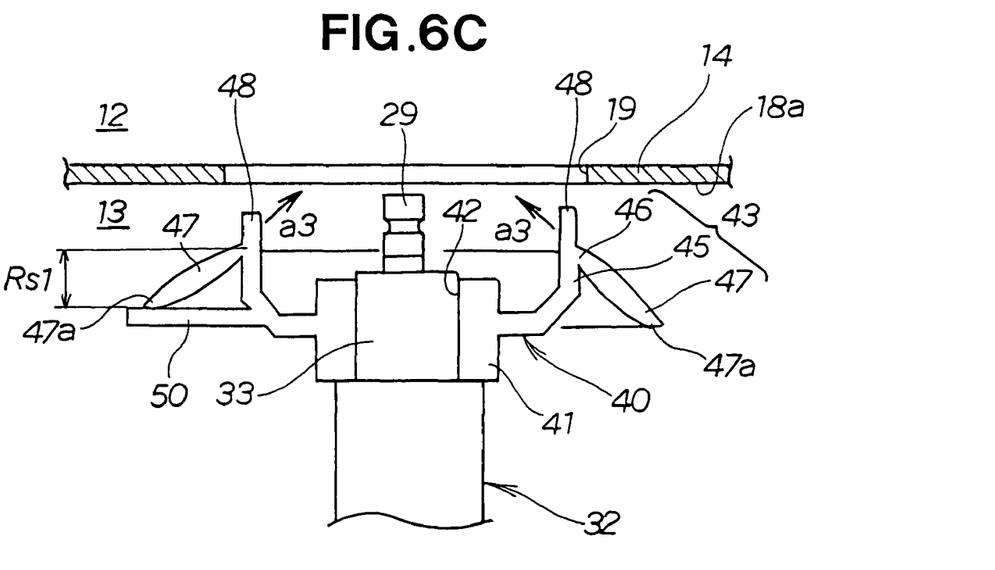

A hand of the human operator is then inserted, through the through-hole 19, into the engine compartment 13 from the passenger compartment 12, as shown in FIG. 6C. The hand then manipulates the operating convexities 48 to bend the lip section 43 toward the dashboard 14. In other words, the operating convexities 48 are collapsed (e.g., bent, pushed, or pulled inward) inward by the hand as indicated by arrows a3. As a result, the elastic lip 47 is inverted, with the thin part 46 acting as a bending fulcrum, resulting in the state shown in FIG. 6D.

Figure 6D:
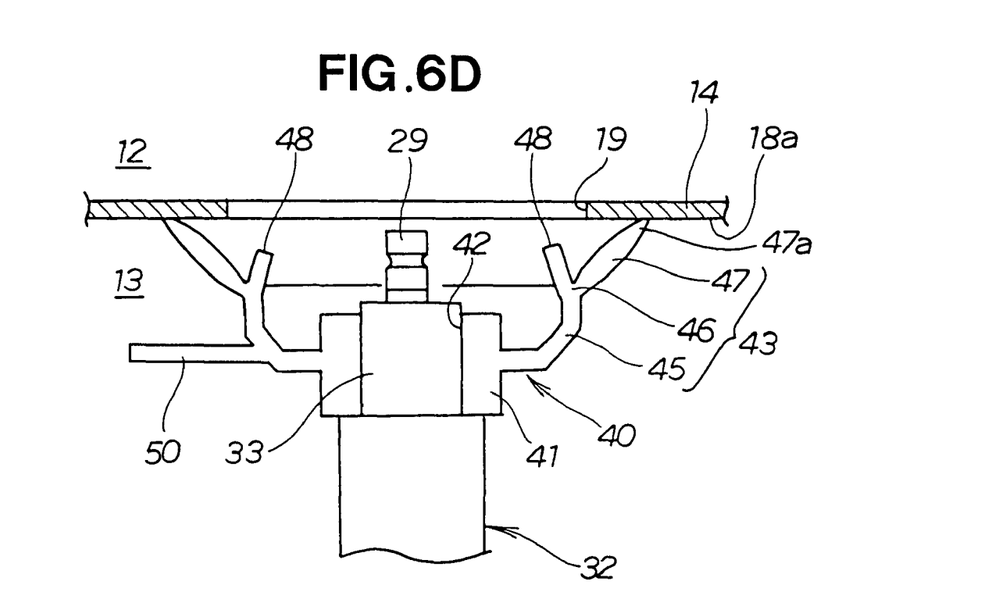

In other words, the end 47a of the lip section 43 is brought into contact with the surface 18a of the dashboard 14 and is pressed against the surface 18a by the own elastic force of the lip, as shown in FIG. 6D. Upon making contact with the surface 18a of the dashboard 14, the distal end 47a surrounds the through-hole 19. The operation for mounting the intercompartment sealing member 40 is thereby finished. The through-hole 19 between the passenger compartment 12 and engine compartment 13 can thus be sealed.

Note that the operation for connecting the steering shaft 22 (see FIG. 1) and shaft joints 23 and 24 (see FIG. 1) to the input shaft 29 of the steering gear mechanism 25 may be performed after the mounting operation of the intercompartment sealing member 40.

As apparent from the above description, the following operation and advantageous benefits can be achieved according to the configuration of the intercompartment sealing member 40.

The operating convexities 48 via which the lip part 43 can be bent are formed on the surface 43a of the lip section 43 that faces the dashboard (panel) 14, as shown in FIGS. 1 and 2. Therefore, the human operator can insert his or her hand from the passenger compartment (second compartment) 12, which is on the side opposite the engine compartment (first compartment) 13 where the intercompartment sealing member 40 is disposed, and through the through-hole 19 to manipulate the operating convexities 48.

Manipulating (e.g., bending, pushing, or pulling) the operating convexities 48 allows the lip section 43, which is located apart from the surface 18a of the dashboard 14, to be inverted via its own elastic force toward the panel dashboard 14. As a result, the end 47a of the lip section 43 that extends toward the panel dashboard 14 in a spread-out form surrounds the through-hole 19 and sealably makes contact with the surface 18a of the panel dashboard 14.

The intercompartment sealing member 40 is thus designed as a member for creating a seal between the engine compartment 13 and passenger compartment 12. For this reason, the lip section 43 can very readily be bent from the passenger compartment 12, which is on the opposite side, even when the lip section 43 is difficult to bend in the engine compartment 13 where the intercompartment sealing member 40 is disposed.

In other words, the engine 16a, transmission 16b, and various other components are generally disposed in the engine compartment 13. For this reason, the intercompartment sealing member 40 mounted to the steering gear case 32 would be difficult to see and operation space would be limited. In contrast, according to the above-described embodiment, the bending can very readily be performed from the passenger compartment 12, which is on the side opposite the engine compartment 13.

Further, as shown in FIG. 4 and FIG. 6C, the intercompartment sealing member 40 has the stopper portions 50 for limiting a bent amount Rs1 through which the lip section 43 can be bent in the reverse direction away from the surface 18a of the panel 14. Thus, the bent amount Rs1 is limited by the stopper portions 50 as the lip section 43 is bent away from (i.e., in the reverse direction from) the surface 18a of the panel 14. As the human operator manipulates (e.g., bends or pushes) the operating protrusions or convexities 48, an inverting force acts on the lip section 43 so as to invert the lip section 43 toward the surface 18a of the panel 14. Because the bent amount Rs1 is limited by the stopper portions 50 as noted above, the lip section 43 can be readily bent toward the surface 18a of the panel 14 even with a small manipulating force from the human operator. Thus, the lip section 43 can be reliably inverted toward the surface 18a of the panel 14 uniformly along the entire periphery thereof. Further, the human operator may manipulate the operating protrusions 48 with only a small force.

Namely, even in the case where the operation for bending the lip section 43 is difficult to perform in the engine room 13 provided with the seal member 40, the instant embodiment allows the lip section 43 to be reliably bent extremely easily with only a small manipulating force applied from the passenger compartment 12. As a result, the mounting workability of the seal member 40 can be even further enhanced.

Further, as the lip section 43 is bent toward the side opposite the dashboard 14, as shown in FIG. 6C, it is held in the bent state by its elasticity. Further, as the operating protrusions 48 are bent radially inwardly of the lip section 43, an inverting force acts on the lip section 43 to bend or invert the lip section 43 toward the dashboard 14. Because regions of the lip section 43 where the operating protrusions 48 are provided (i.e., 0° and 180° positions in the illustrated example of FIG. 4) are subjected to great inverting forces, they can be easily bent to the dashboard 14. However, because regions of the lip section 43 remote from the operating protrusions 48 (i.e., 90° and 270° positions in the illustrated example of FIG. 4) are subjected to small inverting forces, they can not be easily bent or inverted toward the panel 14.

In the instant embodiment, however, the two stopper portions 50 are located to be phase-shifted by 90° with respect to the operating protrusions 48 as the lip section 43 is viewed from the side of the distal end 47a. Therefore, the bent amount Rs1 in regions of the lip section 43 remotest from the operating protrusions 48 is limited to a small value by the provision of the stopper portions 50. Thus, regions of the lip section 43 remote from the operating protrusions 48 can be readily inverted toward the surface 18a of the panel 14 with a small manipulating force. Thus, the lip section 43 can be reliably inverted toward the surface 18a of the panel 14 uniformly along the entire periphery thereof.

In the present invention, the "receiving member" disposed in the first compartment 13 is not limited to the steering gear case 32 of the steering device 17.

The intercompartment sealing members 40 of the present invention is preferably employed in passenger vehicles and other vehicles 10 having an engine compartment 13 in which an engine 16a, transmission 16b, and a variety of other components are disposed.

Obviously, various minor changes and modifications of the present invention are possible in light of the above teaching. It is therefore to be understood that within the scope of the appended claims the invention may be practiced otherwise than as specifically described.

What is claimed is:

1. A sealing member designed to be disposed between a first compartment and a second compartment of a vehicle for sealing a through-hole formed in a panel that defines the first and second compartments, said sealing member being formed of an elastic material and comprising:
   a tubular section designed to sealably fit onto a through-hole-facing end of a receiving member disposed in the first compartment;
   a lip section extending from said tubular section toward the panel in a spread-out form to surround the through-hole and sealably contact a surface of the panel, said lip section being bendable in a direction of contact such that said lip section contacts the surface of the panel and in a reverse direction such that said lip section gets away from the surface of the panel;
   an operating convexity provided on a panel-facing surface of said lip section for facilitating an operation to bend the lip section;
   a stopper portion having a segmented plurality of extensions extending around a circumference of the lip section for limiting a bent amount in a circumferential direction of said lip section to a smaller value than a bent amount of a in the circumferential direction of the lip section when the lip section is bent in the reverse direction.

2. A sealing member according to claim 1, wherein said stopper portion is located to be phase-shifted with respect to the operating convexity as said lip section is viewed from a side of a distal end thereof facing the panel.

3. A sealing member according to claim 1, wherein said lip section has, between a proximal end thereof continuous with said tubular section and a distal end thereof facing the panel, a thin part that functions as a bending-start part when said lip section is bent, and
   said stopper portion is located between the thin part and the proximal end.

4. A sealing member according to claim 1, wherein said first compartment is an engine compartment of the vehicle while said second compartment is a passenger compartment of the vehicle, and said sealing member is designed as a member for sealing a space between the engine compartment and the passenger compartment.

5. A sealing member according to claim 4, wherein said receiving member is a steering gear case of a steering gear mechanism of a steering device,
   said steering device includes a steering wheel disposed in the passenger compartment, and a steering torque transmission member for transmitting steering torque, produced via said steering wheel, to the steering gear mechanism,
   said through-hole is a hole formed for passage therethrough of the steering torque transmission member and designed to surround the steering torque transmission member.

* * * * *